US010657820B2

(12) United States Patent
Mueck et al.

(10) Patent No.: US 10,657,820 B2
(45) Date of Patent: May 19, 2020

(54) SENSOR DATA SHARING MANAGEMENT

(71) Applicant: Intel Corporation, Santa Clara, CA (US)

(72) Inventors: Markus Dominik Mueck, Unterhaching (DE); Leonardo Gomes Baltar, Munich (DE); Krzysztof Stanislaw Legutko, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/233,152

(22) Filed: Dec. 27, 2018

(65) Prior Publication Data
US 2019/0130754 A1    May 2, 2019

(51) Int. Cl.
*G08G 1/16*    (2006.01)
*B60W 30/095*    (2012.01)
*H04W 4/46*    (2018.01)
*H04W 4/44*    (2018.01)
*G08G 1/00*    (2006.01)
*H04W 84/00*    (2009.01)
*H04W 4/38*    (2018.01)

(52) U.S. Cl.
CPC ......... *G08G 1/163* (2013.01); *B60W 30/0953* (2013.01); *G08G 1/166* (2013.01); *G08G 1/22* (2013.01); *H04W 4/38* (2018.02); *H04W 4/44* (2018.02); *H04W 4/46* (2018.02); *H04W 84/00* (2013.01); *B60W 2400/00* (2013.01); *B60W 2550/308* (2013.01)

(58) Field of Classification Search
CPC .......... G08G 1/163; G08G 1/22; G08G 1/166; H04W 84/00; H04W 4/38; H04W 4/46; H04W 4/44; B60W 30/0953; B60W 2550/308; B60W 2400/00
See application file for complete search history.

(56) References Cited

U.S. PATENT DOCUMENTS

| 9,940,834 B1 * | 4/2018 | Konrardy ......... G08G 1/096725 |
| 10,417,914 B1 * | 9/2019 | Vose ..................... G08G 1/094 |
| 2010/0010742 A1 | 1/2010 | Mochizuki |
| 2010/0019891 A1 | 1/2010 | Mudalige |

(Continued)

OTHER PUBLICATIONS

International Search Report issued for corresponding PCT-Application PCT/US2019/061582, dated Mar. 12, 2020, 13 pages (for informational purpose only).

*Primary Examiner* — Ryan W Sherwin
(74) *Attorney, Agent, or Firm* — Viering, Jentschura & Partner MBB

(57) ABSTRACT

Herein is disclosed a vehicle sensor-data sharing device, comprising one or more processors configured to receive sensor information representing sensor data output from the one or more sensors of a first vehicle; determine a reliability indicator indicating the reliability of the received sensor information; determine from the received sensor information a criticality indicator indicating the criticality of the received sensor information for the first vehicle; select a data sharing level based on the criticality indicator and the reliability indicator; and generate a message comprising observation information or a request for observation information, wherein the observation information corresponds to sensor information according to the data sharing level.

25 Claims, 7 Drawing Sheets

(56) References Cited

U.S. PATENT DOCUMENTS

| | | | |
|---|---|---|---|
| 2010/0127841 A1* | 5/2010 | D'Ambrosio | G01S 13/931 340/435 |
| 2010/0312432 A1* | 12/2010 | Hamada | G08G 1/163 701/31.4 |
| 2017/0222936 A1 | 8/2017 | Al-Roubaiey et al. | |
| 2017/0236423 A1 | 8/2017 | Bowers et al. | |
| 2017/0294127 A1* | 10/2017 | Nakatani | G08G 1/16 |
| 2019/0130754 A1 | 5/2019 | Mueck et al. | |

* cited by examiner

| Use Case | Illustrations | Description |
|---|---|---|
| Platooning 202 | | Vehicles dynamically form a platoon travelling together. Vehicles in the platoon obtain information from the leading vehicle to manage this platoon. |
| Advanced Driving 204 | | Vehicle/RSU shares its own perception data obtained from its local sensors with vehicles in proximity and that allows vehicles to coordinate their trajectories. |
| Extended Sensor 206 | | Exchange of data gathered through local sensors or live video images among vehicles, RSUs, pedestrian and V2X server. |
| Remote Driving 208 | | Enables a remote driver or a V2X application to operate a remote vehicle. |

FIG. 2

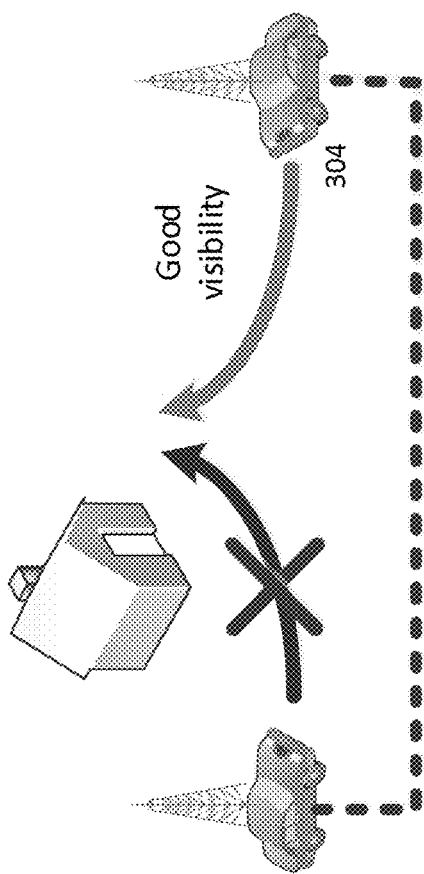
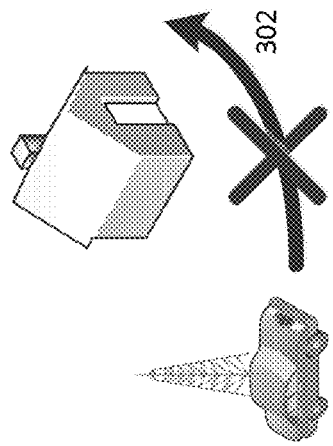
FIG. 3

SENSOR DATA SHARING MANAGEMENT

TECHNICAL FIELD

Various aspects of the disclosure relate generally to the sharing of vehicle sensor information and procedures for regulating sensor sharing based on situational and data evaluation calculations.

BACKGROUND

Modern vehicles are typically equipped with a variety of sensors, which provide a wide breadth of sensor information. As vehicles develop autonomous driving or semi-autonomous driving capabilities, processors within the vehicle use the sensor data to reach driving decisions, such as decisions to permit autonomous driving or semi-autonomous driving. It is also known to share sensor data between vehicles, which may be used, for example, to supplement or evaluate data obtained by one or more sensors in the receiving vehicles. In existing sensor data-sharing protocols, the data-rate required for the exchange of sensor data is fixed, which may make poor use of limited available bandwidth and may not appropriately tailor the shared data.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 2 depicts a variety of common vehicle-to-vehicle communication configurations;

FIG. 3 depicts vehicle data sharing as sensor data enhancement;

DESCRIPTION

Figure 1:
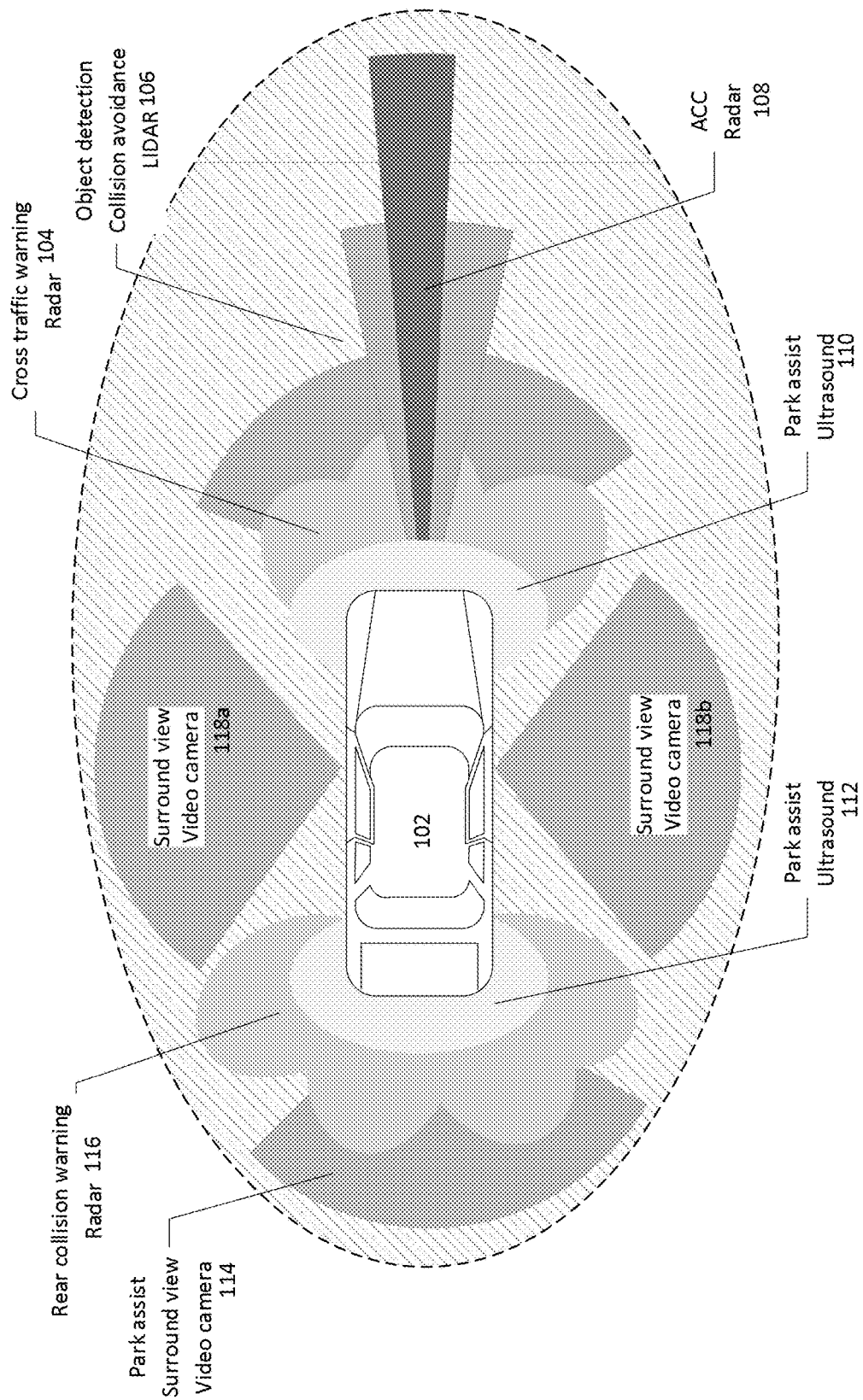
FIG. 1 depicts a vehicle sensor configuration.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers to more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

The principles and methods described herein may be carried out via a plurality of communication systems and protocols. As stated above, one such system is known as Dedicated Short-Range Communications (DSRC), which include one-way and/or two-way short-range to medium-range wireless communication channels that are designed for use in motor vehicles, along with a corresponding set of protocols and standards. The DSRC may be primarily implemented in the United States of America; however, to the extent that DSRC system is implemented elsewhere, the principles and methods disclosed herein may be carried out according to DSRC in any country. Similarly, IST-G5, which may include a plurality of two-way communication channels for short-range communications may be principally used in Europe, and the principles and methods disclosed herein may be applied or carried out according to IST-G5. Furthermore, nothing in this disclosure should be understood to limit the principles and methods disclosed herein as being limited to DSRC and/or IST-G5, but rather said principles and methods may be performed as desired and according to any suitable protocol, whether DSRC, IST-G5, or otherwise.

Although it may be known to transmit sensor information between vehicles, said sensor information data generally includes determinations from other vehicles, such as the presence of a vehicle, the presence of an obstacle, the likelihood of a collision, or otherwise. Although such exchanges may be valuable, under certain circumstances, it may be more valuable to provide data in a less preprocessed form, such as raw sensor data, compressed sensor data, or decisions or determinations carrying some element of raw sensor data or compressed sensor data. By providing these forms of less preprocessed sensor information, the receiving vehicle may be better able to test its own sensor data, and generally to reach better decisions to achieve safe driving. However, substantial utility may also be gained by transmitting preprocessed sensor information (such as determinations, decisions, warnings, and the like) rather than raw sensor information or less preprocessed sensor information. This may be due at least to the fact that raw sensor information and less preprocessed sensor information requires additional bandwidth or other transmission resources to wirelessly transmit the information.

The current 5G Automotive Association (5GAA) standards differentiate between Day-1 (basic safety services) and Day-2 (advanced services) vehicular applications. Day-1 services are allotted a spectrum of 5.9 GHz, but they are limited to 70 MHz including safety applications, non-safety applications and sharing with Urban Rail applications. Day-2 services, on the other hand, include high data rate wireless services such as Sensor Data Sharing. In order to request corresponding additional spectrum, an efficient way of handling Sensor Data Sharing needs to be provided.

Throughout this disclosure, a distinction is made between sensor data and sensor information. Sensor data may be understood to describe any raw data delivered from a sensor. For example, an image sensor may be configured to obtain images from a vicinity of the vehicle, and said sensor may convert the received images to sensor data, such as digital data corresponding to the received images. Sensor information, may be understood more broadly to be any information that corresponds to a sensor. This may include raw sensor information, as described herein as sensor data, but also the result of any level of preprocessing of sensor data. Therefore, sensor information may also include compressed data, or even decisions rendered from sensor data, whether directly or indirectly. It is expressly noted that sensor data may be compressed or altered, or that decisions may be reached from sensor information, before the sensor information is delivered to the one or more processors which may determine the data sharing level. The data sharing level may refer to at least one of an amount of data to share, a level of data compression, and a type or types of data to share along a continuum from raw sensor data to decisions. For example the data sharing level may determine whether the shared data includes raw sensor data showing an obstacle, or whether the shared data includes a determination that an obstacle is present. That is, the In the event that any sensor data processing occurs between (and including) the sensor and the one or more processors, said processed information is included in the recitations herein of the one or more processors receiving sensor data corresponding to one or more sensors of a first vehicle.

As an initial matter, vehicle sensor data can vary significantly in quality. This may be due to a number of factors. First, the sensors themselves may vary greatly among vehicles. Sensors account for a significant cost factor in modern vehicles, and as such, sensors of lower cost and lower quality may be selected for a vehicle. Weather conditions may affect the quality of sensor data, as rain, fog, snow, smog, or the like may impair an image sensor from acquiring high-quality image data. Sensors may also be impaired by radio frequency interference, or by a variety of other factors.

A vehicle may be configured to evaluate the reliability of sensor data. The vehicle may, for example, evaluate the quality of sensor data based on the quality of the corresponding sensors. That is, in the case that one or more sensors of lesser quality are installed in the vehicle, the vehicle may rate its sensor data as being less reliable than higher quality sensor data. This may impact vehicle decision-making, since a vehicle with poor-quality sensors that have been deemed less reliable may seek sensor data from other sources to supplement its own sensor data. The vehicle may specifically seek out sensor data that is deemed to be more reliable.

A vehicle may also evaluate the reliability of its sensor data based on a consistency of its sensor data. That is, data from various data source are expected to correspond to one another. Corresponding data from multiple sources may be deemed reliable, whereas data that does not correspond may be deemed unreliable. For example, a vehicle may be equipped with image sensor data that is interpreted as indicating a forward movement of the vehicle at a velocity of 30 km per hour. The same vehicle may have a speedometer, which is configured to display the current vehicle velocity. If the speedometer indicates a velocity of 30 km per hour, the data from the speedometer and the image sensors correspond to one another, and they may been considered to be more reliable. If, however, the speedometer indicates a velocity of 0 km per hour while the image data suggests a velocity of 30 km per hour, one or both data sources may be deemed to be less reliable.

Other factors which may be considered in assessing sensor information reliability include, but are not limited to, the quality of the transmitting vehicle and/or corresponding sensors; a distance between the transmitting vehicle and receiving vehicle; a line of sight connection between the transmitting vehicle and the receiving vehicle; a communication quality of the transmission of sensor information; a weather condition that may affect quality of obtaining sensor information or transmitting sensor information; whether the sensor information is obtained or verified by the transmitting vehicle; or whether the sensor information is simply relayed or repeated from other vehicles. To the extent that the sensor information corresponds to images, the images may be assessed for image characteristics, such as focus, blurriness, pixelation, noise, or otherwise.

Depending on the circumstances, vehicles may be configured to trust their own sensor data above sensor data received from other vehicles. For example, in a vehicle with high quality sensors, or with high quality sensor data, the vehicle may trust its own data over data received from other vehicles, since the veracity of other vehicles' sensor data is uncertain. To the extent that data from other vehicles conflicts with the receiving vehicle's sensor data, the receiving vehicle may trust its own sensors. Alternatively, if the receiving vehicle understands its own sensors to be of inferior quality, the receiving vehicle may be configured to trust the other vehicles' sensors above its own. In that manner, a conflict existing between sensor data of the receiving vehicle and sensor data of an exterior vehicle may be resolved in favor of the most reliable data.

Vehicles may also be configured to determine criticality. A criticality determination may correspond to a perceived risk of collision or injury. A criticality determination may be predicated upon a plurality of factors, including, but not limited to, any one or more of: a number of vehicles within a vicinity of the determining vehicle, the identification of one or more hazards in a vicinity of the vehicle or along an estimated path of vehicle travel, a velocity of the vehicle and/or any nearby vehicles, a change in acceleration of the vehicle and/or any surrounding vehicles, or a collision avoidance maneuver of one or more vehicles in a vicinity of the vehicle.

Criticality may also be determined based on the sufficiency of the vehicle's sensor data for a maneuver. For example, the vehicle may be unable to see around an obstacle in a direction of a planned or partially executed turn. In this case, the criticality may be increased, since the available data are insufficient.

As described herein, a level of sensor data to be shared with other vehicles may be modified based on a detected criticality and a reliability of the data.

With respect to criticality, the criticality may be detected and determined according to a plurality of criticality levels. In this Disclosure, and for the sake of simplicity, three levels are used. However, the number of criticality levels is not limited to three. Rather, the number of criticality levels may be of any number whatsoever. According to one aspect of the disclosure, the number of criticality levels may be five, may ten or fewer, twenty or fewer, fifty or fewer, one hundred or fewer, or greater than one hundred.

An evaluated criticality level may be a determining factor in an appropriate level of data sharing. In a low-criticality situation, such as a situation with few vehicles in close proximity to the evaluating vehicle, an area with generally low vehicle density, an area with few or no identified obstacles or hazards, or generally an area where a low level of danger is detected, the level of data sensor sharing may be reduced. That is, sensor data sharing is performed, at least in part, to assist a vehicle and/or driver in avoiding collision or injury. In a low-criticality situation, and thus in a situation in which the risk of collision or injury is low, the need to share data to prevent collision or injury is also reduced. Thus, a lower level of data sharing may be appropriate in a low-criticality situation.

An increase in criticality may correspond with an increase in the utility of data sharing. For example, during intermediate criticality, such as in a dense driving situation or when a non-imminent danger has been identified, an increase in sensor data sharing may be appropriate, as additional sensor data may assist a vehicle and/or driver in avoiding collision or injury. Thus, a moderate increase of criticality may correspond to a moderate increase in data sharing.

The presence of an imminent danger may be reason for a very high level of data sharing. That is, some events while driving indicate a strong likelihood of a collision within the near future, but may still provide sufficient time for receipt of data, processing of data, and reaction of the vehicle and/or the driver. Such events may include, but are not limited to, emergency breaking of a nearby vehicle, evasive maneuver of a nearby vehicle, impact of a nearby vehicle within another object, or otherwise. Such events may correspond with a high degree of criticality, but may also permit sufficient time to share and process information before collision, such that additional sensor data sharing may reduce the likelihood or severity of a collision or injury.

Other situations may warrant a more limited sharing of sensor data. Such examples may include, but are not limited to, data of near certainty, and data of limited utility.

With respect to near certain data, it may be preferable to transmit a decision or determination, rather than the data which enabled the decision or determination. Under many circumstances, sensor data is transmitted in a semi-processed state, wherein determinations may be transmitted along with probabilities of said determinations, and even with data supporting or calling into question the determinations. This system allows for receiving vehicles to evaluate the likelihood of the transmitted determinations by comparing the data to their own sensor data and following any corresponding algorithms for data accuracy determination. For example, if the vehicle detects an obstacle with a probability close to 1 (meaning that the obstacle is almost certainly present), it may be sufficient, and may even be preferable, to simply transmit a message indicating that an obstacle is present, rather than transmitting a bulk of information that permits other vehicles to determine the veracity of the statement that an object is present. Thus, as a certainty of a data-based determination increases, the need to transmit data which permits other vehicles to verify determination becomes diminished. On the other hand, as the certainty of a data-based determination decreases, the need to transmit data permitting other vehicles to evaluate the certainty of the determination increases.

Also, an appropriate level of sensor data to transmit may be impacted by a utility of the received sensor data. Sensor data may be impaired by a variety of factors, such that the received sensor data may be of varying utility. For example, received sensor data may include significant quantities of unwanted noise, or image data may be impaired by lack of light, visual obstructions, or otherwise. That is, the usefulness of the received sensor data may be diminished by a variety of factors, and sensor data with diminished utility may be less important to transmit. Thus, a vehicle may be configured to assess the utility of the received sensor data, and to determine an amount of sensor data to transmit based on the perceived utility. Where the sensor data is determined to be of significant utility, a significant portion of the sensor data may be available for transmission. Where the sensor data is perceived to be of limited utility, little of the sensor data may be made available for transmission. A vehicle may be configured to transmit an error message to other vehicles, or to simply state that no decision regarding the sensor data is possible.

On the other hand, in the event that sensor data includes relevant information but does not lead to a conclusive decision, and the exchange of sensor data may result in improved reliability. That is, despite having sensor data with appreciable utility, an individual vehicle may be unequipped to construe the sensor data to reach a decision or determination. However, the sensor data may be transmitted to one or more other vehicles and then combined with, or tested against, other sensor data. This may permit a better determination with a higher likelihood of accuracy to be reached.

FIG. 1 depicts a vehicle sensor configuration. In this case, a vehicle 102 is equipped with a plurality of vehicle sensors. The sensors include, but are not limited to, a radar sensor 104 for cross traffic warning, a lidar sensor 106 for object detection and/or collision avoidance, a radar sensor 108 for adaptive cruise control (ACC), a front ultrasound sensor 110 for park assist, a rear ultrasound sensor 112 for park assist, a surround view video camera 114 for park assist, a radar 116 for rear collision warning, a left video camera 118a first surround view, and a right video camera 118b first surround view. The sensors may be configured to detect sensor data, and the sensors may be communicatively connected to one or more processors, which may be configured to process the sensor data according to the methods and procedures described herein. Each sensor may produce a raw data feed, which is transferred to the one or more processors for processing. The raw data may be preprocessed at one or more stations prior to reaching the one or more processors, or it may be preprocessed by the one or more processors, or processed from its raw form by the one or more processors. The sensors depicted in this figure are selected to depict a range of available sensors which may be used to detect data for processing according to the methods and procedures disclosed herein. The sensors depicted are not exhaustive, and any sensor may be used for the methods and procedures disclosed herein, without limitation. A nonexhaustive list of additional sensors that may be used with the methods and procedures disclosed herein includes thermometers, speedometers, odometers, accelerometers, gyroscopes, light sensors, microphones, hydrometer's, or otherwise.

FIG. 2 depicts a variety of common vehicle-to-vehicle communication configurations. Vehicles may be configured to communicate with one or more additional vehicles during a driving function. The communication may arise out of a variety of configurations or concerns. Vehicles may be configured to engage in platooning 202, in which vehicles dynamically form a platoon while traveling together. Vehicles in the platoon may obtain information from a leading vehicle to manage the platoon. This may become necessary based on a distance kept between the platoon and vehicles, since the vehicles may be configured to travel very closely to one another, thereby limiting both vision and reaction time for vehicles other than the front vehicle. Platooning vehicles may be able to travel in a row at significantly reduced space between vehicles. This may require high data rates for services that provide vehicles other than the vehicle in the front of the platoon with information corresponding to the available sight information from the front vehicle. In this manner, the subsequent platooning vehicles may obtain data otherwise only available to the first vehicle. This may be referred to as providing platooning vehicles with "look through services." The first vehicle might have a camera and will forward the image to the remainder of the vehicles so that they can see. As such, communication between the platoon did vehicles becomes paramount.

Vehicles may be configured to communicate with one another in advanced driving situations 204. Vehicles may share their perception data obtained from their own local sensors with other vehicles in their vicinity. This may permit vehicles to coordinate their own trajectories, and it may involve improved processing of sensor data.

Vehicles may communicate to function as an extended sensor for one another 206. In this configuration, data gathered through local sensors or live video images may be shared among other vehicles, roadside units (RSUs), pedestrians, and/or V2X servers.

Vehicles may communicate during a remote driving configuration 208, which may permit a remote driver or a V2X application to operate a vehicle remotely.

FIG. 3 depicts vehicle data sharing as sensor data enhancement. Although vehicles are often equipped with a variety of sensors, which are capable of perceiving information both in a variety of directions or spaces and in a variety of formats, the information available to the vehicle is nonetheless limited. A common example of such limited information can be seen from image data. Vehicles may be equipped with a plurality of image sensors, which may be capable of perceiving information in a 360 degree fashion around a vehicle; however, irrespective of the quantity of sensors, the quality of sensors, or their placement, the sensor information will be limited by obstacles or other opaque features within the sensors' field of vision. In this figure, vehicle 302 is depicted as approaching a building, an having a presumptive intention to make a left-turn around the building. As the vehicle approaches the building, the building's structure will obscure the vehicle's sensors' vision of the area of travel. That is, the vehicle will not be able to perceive the area around the opposite side of the building. This can present a hazard for the vehicle, since the unperceived area may include obstacles or other driving hazards. Without information of these other obstacles or hazards, the vehicle will not be able to consider and account for the them.

In contrast to vehicle 302, vehicle 304 is depicted as approaching the building from the opposite direction. As vehicle 304 approaches the building, vehicle 304 has a view of the area that vehicle 302 cannot yet perceive. As such, vehicle 304 is likely aware of any obstacles or hazards that are unknown to vehicle 302. By following a vehicle data sharing protocol, vehicle 304 can transfer its sensor data or information corresponding to its sensor data to vehicle 302, from which vehicle 302 can perceive any obstacles or hazards in its path of travel. As stated herein, the data can be tailored based on criticality and reliability. For example, where vehicle 302 perceives a lack of data for its path of travel, this may correspond to a decreased level of sensor data reliability, and therefore vehicle 302 may request additional sensor data from vehicle 304 to accommodate vehicle 302's relative lack of information. Similarly, in the event that vehicle 304 perceives a notable obstacle or hazard in its path of travel, this may correspond to an increased level of criticality, which may cause vehicle 304 to share an increased level of sensor data. As described herein, levels of sensor data may be altered by altering a volume of data to share and/or a level of data pre-processing.

Figure 4:
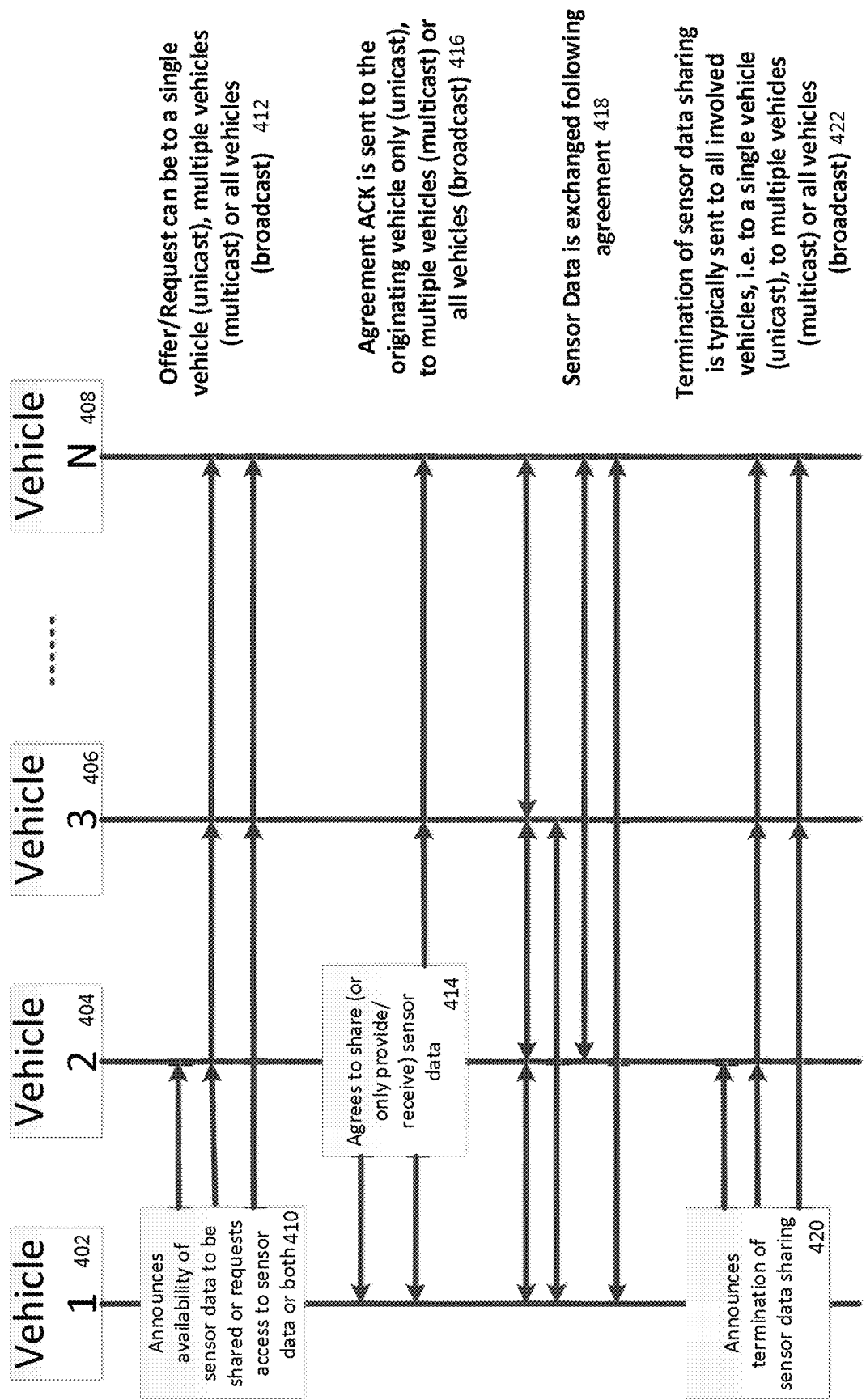
FIG. 4 depicts a vehicle sensor data sharing communication protocol between four vehicles.

FIG. 4 depicts a vehicle sensor data sharing communication protocol between four vehicles, vehicle one 402, vehicle two 404, vehicle three 406, and vehicle four 408. Vehicle one 402 may announce an availability of sensor data to be shared or may request access to sensor data or both 410. The offer or request for data sharing can be to a single vehicle (unicast), to multiple vehicles (multicast) or to all vehicles (broadcast) 412. After receiving the data sharing communication from vehicle one 402, vehicle two 404 agrees to share (or only provide/receive) sensor data 414. The agreement, such as, for example, in the form of an acknowledgement (ACK) may be sent to the originating vehicle only (unicast), to multiple vehicles (multicast) or all vehicles (broadcast) 416. The sensor data may be exchanged following agreement 418 according to an agreed upon sensor data exchange. Upon completion of the exchange, or due to any change in circumstances rendering data exchange unwanted, a vehicle (in this example, vehicle one 402) may announce a termination of sensor data sharing 420. The termination of sensor data sharing is typically sent to all involved vehicles, i.e. to a single vehicle (unicast), to multiple vehicles (multicast) or all vehicles (broadcast) 422.

Figure 5:
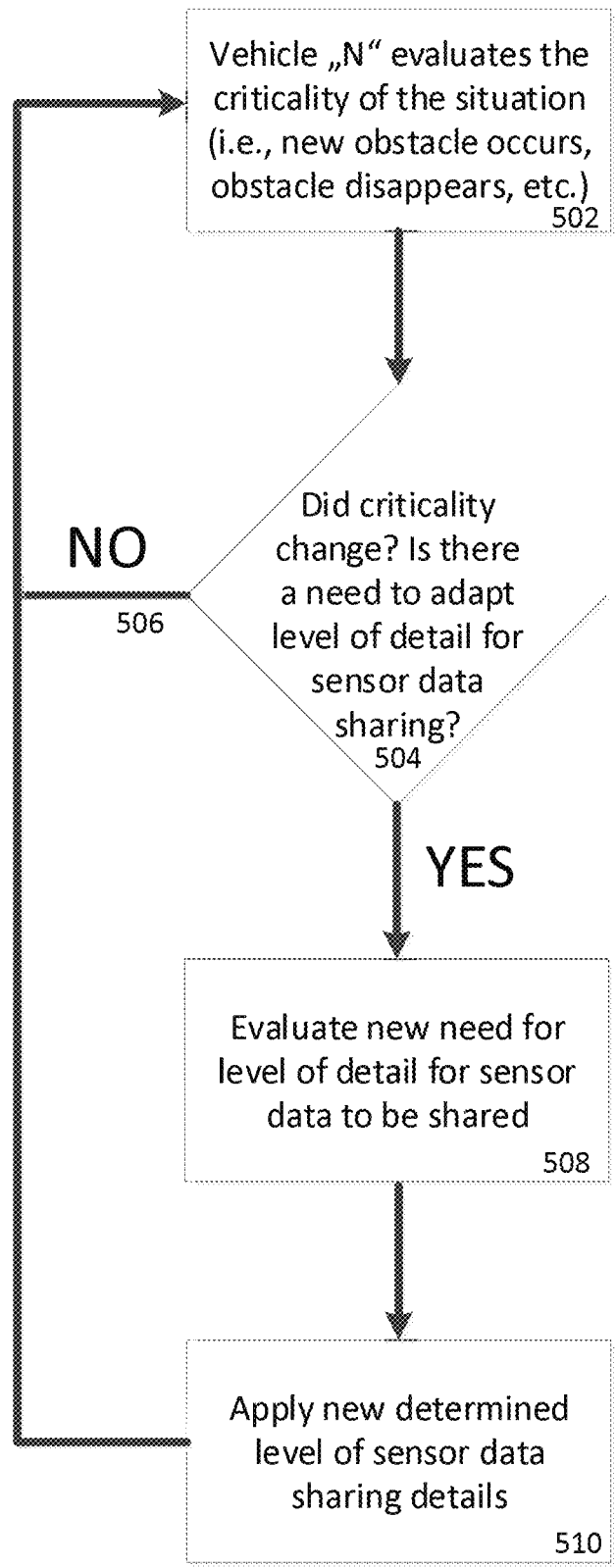
FIG. 5 depicts a decision tree for data sharing management.

FIG. 5 depicts a procedure for data sharing management. According to a first step, the vehicle evaluates a criticality of a situation based on available sensor data 502. The criticality may be determined based on a plurality of related factors, including, but not limited to, the newly detected presence of an obstacle, the disappearance of an obstacle, a change in behavior of surrounding vehicles, or otherwise. Once the criticality is determined, the criticality may be compared with a previously determined criticality. If the criticality has changed, it may be determined whether there is a need to adapt a level of detail for sensor data sharing. 504. If no adaptation of a level of sensor data sharing is required 506, the determination of criticality may again be repeated and subsequently compared with previous determinations. If it is determined that there is a need to adapt a level of detail for sensor data sharing 504, the current requirements for sensor data sharing are evaluated 508. This may include determining the new level of detail for sensor data sharing. Once the new level is determined, the new level of sensor data sharing is applied 510. This process may be repeated to provide for a continuous adaptation of sensor data sharing levels.

The sensor information may be varied according to at least one of an amount of preprocessing and a dedication of resources. With respect to one amount of preprocessing, the transmitted information may correspond to a range of preprocessing from little or no preprocessing (such as in the transmission of raw data), to compressed versions of the sensor data, to high levels of preprocessing (such as in the transmission of decisions and determinations).

Specifying the dedication of resources available for a transmission of sensor information may include, but is not limited to, specifying a range of bandwidth for transmission of the sensor information, specifying a number of frequencies for transmission of the sensor information, and/or specifying a particular frequency range, such as whether sensor information is transmitted within a conventional bandwidth or a millimeter wave bandwidth. Such decisions may have a significant impact on the transmission speed and volume of data that may functionally be transmitted.

According to one aspect of the disclosure, the dedication of resources may be related to the level of preprocessing performed. Highly preprocessed sensor information may correspond to a comparatively small volume of data to transmit. For example, certain decisions or observations may be reduced to a very small number of bits, which may be transmitted to represent the presence of an obstacle, a turn of a road, a change in criticality, or otherwise. In order to successfully transmit such limited volumes of data, it is unnecessary to dedicate a large bandwidth or a frequency range capable of transmitting large volumes of data. That is, in the event that high preprocessing is used, it may be acceptable to limit bandwidth or rely upon a conventional frequency range that may have limitations in the volume of transmission possible as compared to a millimeter wave range, for example. On the other hand, in the event that raw sensor data, or generally less preprocessed sensor information, is to be transmitted, it may be difficult or impossible to transmit said data in a small number of bits, and significantly more resources may be required. In this case, the transmission of said data may require additional bandwidth and/or changes to a frequency range that is able to accommodate a faster or more voluminous data transfer.

Figure 6:
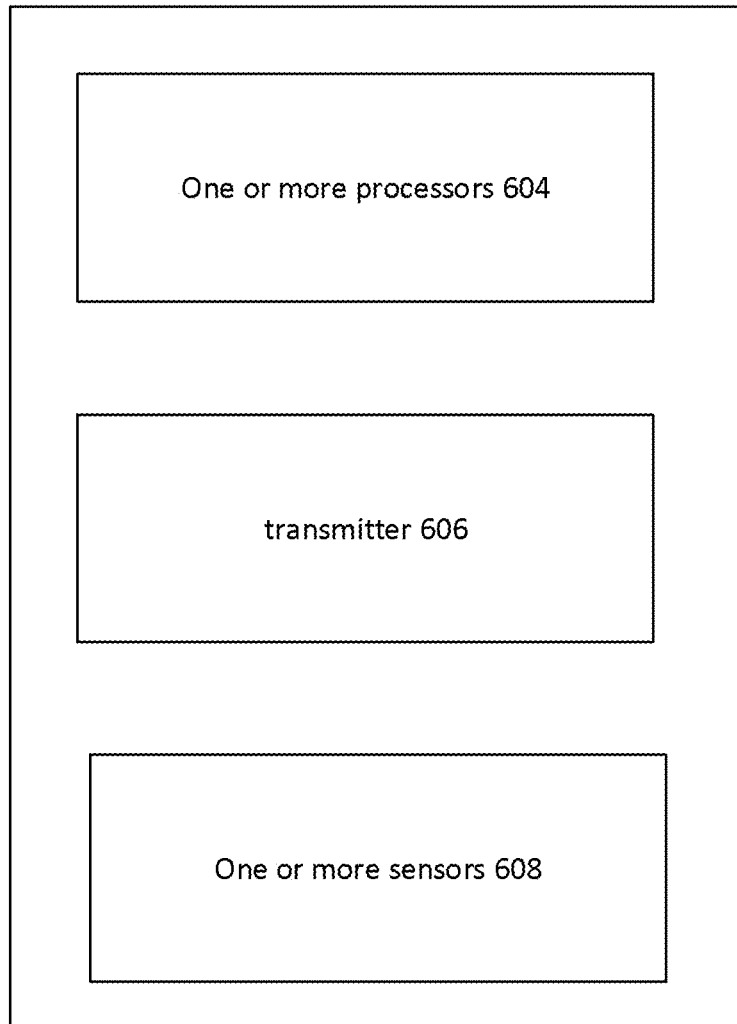
FIG. 6 depicts a vehicle sensor-data sharing device.

FIG. 6 depicts a vehicle sensor-data sharing device 602, including one or more processors 604, configured to receive sensor data corresponding to one or more sensors of a first vehicle; determine from the received sensor data a criticality factor, corresponding to a level of criticality for the first vehicle; determine a reliability factor, corresponding to a level of reliability of the received sensor data; select a data sharing level, corresponding to a level of data to be shared, based on the criticality factor and the reliability factor; and send, via a transmitter 606 communicatively coupled to the one or more processors, sensor information or a request for sensor information; wherein the sensor information corresponds to sensor data according to the data sharing level. The one or more processors 604 may be communicatively coupled to one or more sensors 608, which provide to the one or more processors 604 the sensor data.

Figure 7:
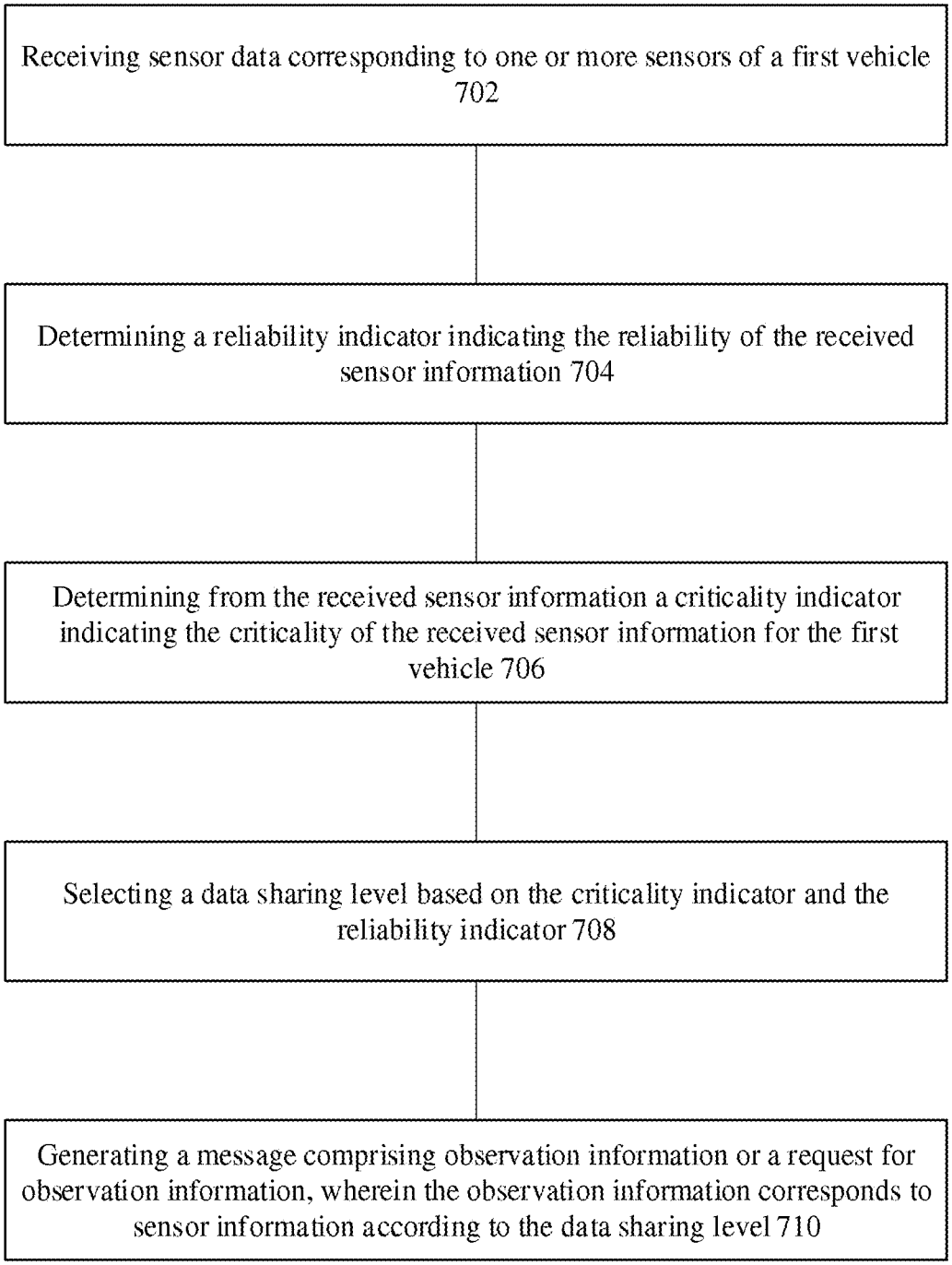
FIG. 7 displays the logical process of the server receiving image data from one or more vehicles.

FIG. 7 depicts a method of vehicle sensor-data sharing, including receiving sensor information representing sensor data output from the one or more sensors of a first vehicle 702; determining a reliability indicator indicating the reliability of the received sensor information 704; determining from the received sensor information a criticality indicator indicating the criticality of the received sensor information for the first vehicle 706; selecting a data sharing level based on the criticality indicator and the reliability indicator 708; and generating a message including observation information or a request for observation information, wherein the observation information corresponds to sensor information according to the data sharing level 710.

As described herein, the level of sensor data sharing may be determined based on a relationship between a sensor reliability determination and a level of criticality. For description of this determination, and for simplicity of the explanation, the categories of sensor data reliability and criticality will be described herein on three levels each, essentially corresponding to low, medium, and high. These categories may, however, be calculated according to a plurality of levels, of any number whatsoever, and should not be understood as being limited to three levels.

The determination of sensor reliability or criticality may be performed in any order. That is, the one or more processors may be configured to first determine sensor reliability and subsequently determine criticality, or first determine criticality and subsequently determine sensor reliability, or to concurrently or simultaneously determine sensor reliability and criticality. Alternatively, sensor reliability may not require a separate determination, but may correspond to a predetermined and/or store determination. That is, in some circumstances, sensor reliability may be predicated upon a quality of sensors, which may be a fixed value, as sensors are unlikely to change during the course of vehicle activity. As such, the sensor reliability value may correspond to a fixed value, which may then be compared to a determination of criticality.

Assuming a high level of sensor reliability, the high level of sensor reliability may be compared to a determined level of criticality. In the event that a high level of sensor reliability corresponds to a high level of criticality, it may be useful, but is not essential, to acquire additional sensor data from surrounding vehicles. This may be due to the fact that the vehicle already obtains high quality sensor data from its own sensors, and therefore any utility from received sensor data from other vehicles may be diminished. In the event that it is decided to obtain some level of additional sensor data from other vehicles, it may be preferred to obtain sensor data that also corresponds to a high level of reliability, as providing less reliable sensor data may diminish the overall reliability of the vehicle's sensor information. In the event that sensor reliability and criticality are both high, it may be sufficient to obtain low data-rate feedback, rather than large volumes of raw data. Such feedback may include determinations from one or more other vehicles, such as, for example, "vehicle in front is breaking," "an obstacle is ahead," "traffic congestion begins in 50 meters," or otherwise.

Assuming a high level of sensor reliability and a medium level of criticality, it may be useful, but is not essential, to acquire additional sensor data from surrounding vehicles. Similarly, it may be preferable to obtain only high quality sensor data, as obtaining less than high-quality sensor data may diminish the overall reliability of sensor information available to the vehicle. If sufficient capacity in the over-air link is available, then low data-rate feedback may be sufficient. As stated above, this feedback may include, but is not limited to vehicle determinations such as "vehicle in front is breaking," "an obstacle is ahead," "traffic congestion begins in 50 meters," or otherwise.

In the event that sensor data is high and criticality is low, it may be unnecessary to acquire additional sensor data from surrounding vehicles. This may be particularly true if over-the-air capacity is particularly limited or is unavailable. In the event that over-the-air-capacity is available, and exchange of sensing data can be triggered to further improve the data acquisition. In addition, some level of data sharing may be desirable. Such data sharing may permit additional sensor data determinations for the receiving vehicle, such as allowing the receiving vehicle to make determinations about situations around corners, which it may otherwise not be able to see, but which may be visible to other vehicles.

In the event that sensor reliability is medium, but the level of criticality is high, it may be essential to acquire additional sensor data from surrounding vehicles. The sensor data may ideally be from vehicles with highly reliable sensor data. The remote sensor data may be able to be combined with sensor data from the receiving vehicle to improve receiving vehicle prediction quality. In this case, a medium data-rate stream may be provided. This may include, for example, some prefiltered data. Said prefiltered data may be highly tailored for a given implementation; however, such prefiltered data may include a reduced data volume compared to a raw sensor data stream. Such prefiltered data may also include more information than low data rate feedback such as processor determinations based on received sensor data.

In the event that both the sensor data reliability and criticality are determined to be medium, it may be desirable to acquire limited additional sensor data from surrounding vehicles. Such limited sensor data may ideally be from vehicles with sensor reliability equal to or greater than the receiving vehicle. The remote sensor data may be combined with the receiving vehicle's own sensor data to improve a prediction quality. A low or medium data rate stream may be preferable. Said low or medium data rate stream may typically include prefiltered data.

In the event that the sensor data is reliability determined to be medium while the criticality is determined as low, it may be desired to acquire some limited additional sensor data from surrounding vehicles. This may be particularly true if reliable information and over-the-air capacity is available and sufficient. Some level of data sharing may be sensible in order to permit the receiving vehicle to obtain sensor data information not otherwise available, such as, but not limited to, data corresponding to regions that are not sensor early available to the receiving vehicle's sensors, such as allowing the receiving vehicle to see behind corners.

In the event that the sensor data reliability is determined to be low, but criticality is determined to be high, it may be desirable to acquire additional sensor data from surrounding vehicles. Said acquired sensor data may ideally come from vehicles with highly reliable sensor data, so as to improve the overall reliability of the receiving vehicle's sensor data. Although, because the receiving vehicle's sensor data is presumptively unreliable in this scenario, any level of received sensor data with a higher level of reliability may be an improvement over the available data for the receiving vehicle. In this case, the receiving vehicle may be unable to rely on its own sensor data, and may only be able to rely on remote sensor data. In this case, a high data-rate stream may preferably be applied, such that a maximum volume of sensor data is transmitted to the receiving vehicle. This high data-rate stream may be processed by the receiving vehicle's one or more processors to make sensor data determinations.

In the event that the sensor data reliability is determined to be low, but criticality is determined to be medium, some level of additional sensor data from surrounding vehicles may be desirable. The receiving vehicle may prefer sensor data from vehicles with highly reliable sensor data. It may be preferable to receive sensor data with a higher reliability than the receiving vehicle's sensor data reliability, so as to improve the overall reliability of the vehicle's sensor information.

In the event that both the sensor data reliability and criticality are determined to be low, no or little additional sensor data information from surrounding vehicles may be required. In the event that any additional sensor data information is shared, it may be shared from vehicles with highly reliable sensor data sources. Some level of sharing may be desirable to permit the receiving vehicle to obtain information about areas that may not otherwise be available, such as information from nearby vehicles to permit the receiving vehicle to see around corners or otherwise perceive areas that are not visible to the receiving vehicle.

In evaluating the criticality of the situation, the following list of non-exclusive factors may be considered. If little or no danger exists, such as, for example, there are only few vehicles with significant distances between them, on a sparsely populated road, the level of sensor data to be shared may be reduced. If, however, it is determined that an imminent danger exists, for example, such as during emergency breaking of vehicles, detailed sensor data may be shared in order ensure the best decision possible.

In determining the reliability of the data, the quality of one or more sensors may be considered. The vehicle may be aware of a predetermined sensor quality evaluation, which may correspond to a quality of one or more preinstalled vehicle sensors. Alternatively, or in addition to considering the predetermined sensor quality information, sensor data reliability may be determined by comparing received sensor data for an anticipated correlation. That is, received sensor data of different times may be expected to display a specified relationship, and a failure to display the specified relationship may indicate a sensor data on reliability. For example, a vehicle may be equipped with one or more image sensors which are configured to receive images of a vicinity of the vehicle. From these received images, it may be determined whether the vehicle is moving or stationary. It may also be possible to determine an approximate velocity of the vehicle. In the event that a given velocity is determined, such as, for example, 50 km/h, it may be expected that other sensor data will correspond to the determined velocity. The vehicle may be configured with a speedometer, which would be expected to register a velocity of 50 km/h. If, however, the speedometer registers a velocity of 10 km/h, or indicates that the vehicle is not moving (thereby registering a velocity of 0 km/h), there is a conflict between the received sensor data of the speedometer and the image sensors, and it may be determined that one or both sensor data sources is unreliable. The one or more processors may be configured to compare two or more sensor data sources to make such a determination about sensor data reliability.

If a sensor detects an obstacle with a probability close to 1, it may be sufficient to convey the message "I see an obstacle," since the exchange of detailed statistical data may not be useful. If the sensor data contains little information, it may not be useful to share the data. For example, sensor may be impaired by any number of factors and may return incomplete or unuseful data. An image sensor may be obscured by an obstruction, or a radiofrequency sensor may return only noise. If it is determined that the quality of received data is significantly impaired, the vehicle may be configured to refuse to share data, and may be configured to increase a level of sought-after received data. In the event that data is requested of the vehicle, the vehicle may be configured to return a response that the data is inadequate or that no decision is possible.

If, however, sensor data includes relevant information but does not lead to a conclusive decision, an exchange with other sensors may improve the reliability of vehicle decisions. That is, received sensor information from other vehicles, whether raw sensor data or sensor based decisions, may be provided to the receiving vehicle in order to improve a quality of its own decision-making.

The transfer of sensor data may be understood according to a push approach and a pull approach. According to the pull-approach, a vehicle may pro-actively request sensor data from surrounding vehicles. For this purpose, the concerned vehicle may proceed according to the following steps. First, the vehicle may evaluate criticality of the situation. This may include a determination of whether an imminent danger is detected or whether available sensor data is insufficient to detect such a danger. If either an imminent danger is detected or the sensor data is deemed insufficient, then additional sensor data may be requested from surrounding vehicles.

If no imminent danger is detected, then additional sensor data may be of limited usefulness. In that case, little or no additional data may be requested. In an exceptional case, other vehicles may detect an upcoming danger which may be invisible to the concerned vehicle, and said other vehicles may take the initiative to distribute the warning based on the "push" approach.

Second, reliability of the vehicle's own data is evaluated. If the level of criticality is low and the reliability of the own sensor data is high, little or no additional sensor data from surrounding vehicles is required. Some level of sharing may make sense, e.g. in order to look "around corners," that may be fully visible to other vehicles. If the level of criticality is high and the reliability of own sensor data is low, substantial input from other vehicles is required. Then, the concerned car requests substantial sensor data sharing from the surrounding vehicles.

According to the "Push"-Approach for Sensor Data Sharing, a vehicle may evaluate whether its sensor data may be of value to other surrounding vehicles. If it is assumed to be of value, the vehicle may provide its sensor data to other vehicles without first receiving any specific request or trigger from surrounding vehicles. Of course, the vehicle may also provide its sensor data in response to a specific request or trigger from other vehicles.

In order to evaluate whether its sensor data is valuable to other surrounding vehicles, the following determinations may be made. It may be determined whether the vehicle's own sensor data is reliable. If yes, it may provide value to other vehicles whose sensors are less reliable. Second, it may be determined whether there a critical situation. If a critical situation is determined to be present, the data may indeed support the decision-making in surrounding vehicles.

According to one aspect of the disclosure, additional sensor information may be desirable when a vehicle attempts a maneuver that is associated with an increased risk of collision or injury, or which is associated with a higher degree of criticality. Such maneuvers may include, but are not limited to, a vehicle preparing to pass another vehicle, a vehicle approaching an intersection, a lane change, driving at above a predetermined velocity, a change in acceleration beyond a predetermined threshold, or otherwise.

According to another aspect of the disclosure, a sensor sharing association procedure may be performed as follows. Before the actual sensor data sharing is established, one or more association procedures between vehicles may be triggered. In this manner, a "streaming"-type unicast connection is established after performing a negotiation regarding the data to be shared. Said negotiation may include, but is not limited to, which sensors' data is to be shared, which level of information detail may be shared, and a level of pre-processing or data filtering to be performed.

A level of criticality may be established by the sensor data sink or by the source informing the one or more processors about a critical situation. Both push or pull approaches can involve this negotiation. Moreover, in the event that multiple vehicles are involved, a multicast communication can be established, thereby allowing a single wireless communication to reach the multiple vehicles. In addition, in the event that it is decided among many vehicles in a certain area to share data, and the spectrum resources become scarce, a negotiation and prioritization may need to be established. The establishment of negotiation and prioritization may be achieved according to one aspect of the disclosure using game theory, as the use of game theory may avoid a hierarchy between vehicles.

Game theory is typically applied to make sure that an optimum parameterization is identified jointly and through negotiation between multiple vehicles; this approach is indeed often better than isolated decision making for a specific vehicle. In practice such an isolated decision may only make sense from the point of view of a specific vehicle but may in the end lead to an overall situation of very poor overall efficiency. One example is that a given vehicle may find it reasonable to increase its speed to the maximum level possible in order to reach a destination in the shortest time possible; in practice, however, this may lead to traffic jams and other congestion situations, and in the end the overall efficiency is diminished. Better outcomes may be achieved if vehicles agree on a reasonable stable speed that can be maintained by everybody in order to ensure a constant traffic flow.

In light of this problem, the application of game theory may be beneficial, given that game theory can be used to model human intuition, experience, and decision-making. An additional aspect is that humans make decisions by taking into account environmental conditions, which may be particularly relevant or apparent while driving. For example, driving at a high velocity may be acceptable on high-quality road surfaces and during favorable weather conditions; however, it may be unwise or foolhardy to drive at a high velocity in conditions of fog, rain, or snowfall.

In order to take environmental conditions into account, game theory could be utilized to introduce categories and priorities for decision making strategies. Such categories and priorities may include, but are not limited to:

(1) Assessing the vehicle density of the roadway and making decisions based on this determination. As stated above, even under ideal weather and roadway conditions, it may be undesirable on a macro scale for a vehicle travel at a maximum (or even a high) velocity when the roadway is crowded. Although a high velocity may be achievable for any single vehicle, it will usually lead to poor outcomes when attempted by multiple vehicles in a dense roadway situation. As such, the one or more processors may be configured to take into account the roadway conditions such as vehicle density and may control velocity accordingly. That is, the vehicle velocity may be set to optimize traffic flow rather than optimize speed of any one vehicle. With specific regard to sensor data sharing, two or more vehicles may agree to share sensor data with one another. They may also agree to make common decisions for the benefit of at least the vehicles sharing sensor data, rather than maximizing benefit for any single vehicle. In this manner, a plurality of vehicles sharing sensor data may also agree on a highest acceptable speed based on the traffic density.

(2) Decisions may also be made based on weather and/or visibility. Similar to the principle of speed control based on traffic density, vehicle decisions may also be based on weather and/or visibility. In a situation of poor weather or poor visibility, erratic behavior of any one vehicle may put the other vehicles in danger. As such, the vehicles may agree on a limited speed or limited risk taking to improve overall group safety. The above examples are not limited to traffic density, weather, and visibility, but may rather refer to any group decision-making principle that is influenced by environmental factors.

As an example of such negotiation and prioritization, the association may start after other messages, such as awareness messages, which help to identify whether the concerned vehicle can provide useful information. Each vehicle that is interested in having information from the sensors of another vehicle should perform a request.

According to one aspect of the disclosure, sensor data pre-processing may be determined as follows. Depending on the required level of detail of the sensor data, and depending on the available throughput (bandwidth) to share data, the raw sensing data may be pre-processed depending on one or more of the following requirements. First, the level of processing may depend on the raw sensing data exchange. In this case, no pre-processing is applied, and raw (i.e., unprocessed) sensor output data from one or multiple sensors in a vehicle is transmitted. The transmission of raw sensor data may require significant bandwidth. Furthermore, the transmission of raw sensor data may also require data standardization, such that received sensor data may be understood by the receiving vehicle. "Raw" sensor data may include, but is not limited to, any of mpeg video, mpeg compressed video, jpeg video, jpeg compressed video; jpeg still images; or jpeg compressed still images. Second, the sensor data exchange may occur after limited pre-processing. In this case, some pre-processing is applied to the raw sensor data in order to reduce the throughput (bandwidth) requirements. Typically, instead of streaming raw data all the time, streaming is only applied when one or more changing events are detected, such as a new obstacle being identified (such as a vehicle breaking, etc.), a previously identified obstacle is removed, etc. Third, sensor data exchange may occur after substantial pre-processing. In this case, substantial preprocessing is applied to the raw sensor data in order to minimize the throughput (bandwidth) requirements to the maximum extent possible. According to this third procedure, instead of streaming raw data, only "hard decisions" or "meta data" are shared, such as "vehicle is breaking in front, etc.", or some maximum compression is applied to the sensor data and a decision is provided together with the low resolution sensor data.

The exchange of sensor data and the corresponding level of detail may be adapted using the following processes and/or considerations.

There are many options for pre-processing methods. Data may be shared according to standardized interfaces. That is, for the various levels of resolution or pre-processing, interoperability between equipment of different manufacturers may be beneficial or necessary.

According to one aspect of the disclosure, the methods and principles described herein may be understood as a dynamic adaptation of sensor data amounts, levels, and/or details, based on criticality and reliability.

The transmission of sensor information may be performed according to a vehicle-to-vehicle transmission, a broadcast, or a multicast. In a vehicle-to-vehicle transmission, the transmission may be directed to a specific vehicle, such as an answer to a requesting vehicle, or a transmission to a vehicle that is determined to be relevant. A multicast may be used to transmit to a plurality of vehicles. In this manner, vehicles may register to be part of a receiving network, and the multicast may be directed to the receiving network. A broadcast may be a transmission to any and all vehicles capable of receiving the transmitted information.

According to an aspect of the disclosure, the data transmissions described herein may be performed according to an information-centric networking (ICN) protocol. ICN may be understood as an alternative architecture which operates according to an alternative information-based paradigm, rather than the traditional host-centric paradigm that is common among Internet communications. ICN may require uniformity of stored data elements, such that data elements may be appropriately searched and recognized. As person skilled in the art of ICN implementation will understand the necessary steps to implement an ICN system according to the principles and methods described herein.

According to another aspect of the disclosure, a first vehicle may rely on a second vehicle to reach a decision related the first vehicle's sensor data. In this manner, and in the event that the first vehicle determines that it cannot reach a decision based on its available sensor information, and as an alternative to sending a request for additional sensor information as described herein, the first vehicle may forward its sensor information to the second vehicle and request that the second vehicle reach the necessary decision regarding the sensor data. Upon reaching the decision, the second vehicle may then transmit the decision to the first vehicle. In this matter, the first vehicle is able to obtain a decision, in part from its own sensor data, without requesting sensor data from other vehicles. Rather, the first vehicle uses the second vehicle as a processing resource to process the first vehicle's sensor data in light of sensor data available to the second vehicle.

The following examples pertain to various aspects of the Disclosure:

In Example 1, a vehicle sensor-data sharing device, including one or more processors configured to receive sensor information representing sensor data output from the one or more sensors of a first vehicle; determine a reliability indicator indicating the reliability of the received sensor information; determine from the received sensor information a criticality indicator indicating the criticality of the received sensor information for the first vehicle; select a data sharing level based on the criticality indicator and the reliability indicator; and generate a message including observation information or a request for observation information, wherein the observation information corresponds to sensor information according to the data sharing level.

In Example 2, the vehicle sensor-data sharing device of Example 1, wherein the criticality indicator is a predicted likelihood of collision of the first vehicle.

In Example 3, the vehicle sensor-data sharing device of Example 1 or 2, wherein the one or more processors are further configured to predict a likelihood of collision of the first vehicle using the received sensor data, and wherein the predicted likelihood of collision corresponds to the criticality indicator.

In Example 4, the vehicle sensor-data sharing device of any one of Examples 1 to 3, wherein the reliability indicator is determined from one or more predetermined values.

In Example 5, the vehicle sensor-data sharing device of any one of Examples 1 to 3, wherein the reliability indicator is determined based on a comparison of observation information corresponding to sensor data from a first sensor with observation information corresponding to sensor data from a second sensor.

In Example 6, the vehicle sensor-data sharing device of any one of Examples 1 to 5, wherein the one or more processors are further configured to determine the reliability indicator by comparing observation information corresponding to sensor data from a first sensor with observation information corresponding to sensor data from a second sensor.

In Example 7, the vehicle sensor-data sharing device of any one of Examples 1 to 6, wherein the data sharing level corresponds to at least one of a quantity of sensor data to be shared or a level of sensor data pre-processing.

In Example 8, the vehicle sensor-data sharing device of any one of Examples 1 to 7, wherein the data sharing level is proportional to the criticality indicator.

In Example 9, the vehicle sensor-data sharing device of any one of Examples 1 to 8, wherein the data sharing level is inversely proportional to the reliability indicator.

In Example 10, the vehicle sensor-data sharing device of any one of Examples 1 to 9, wherein the data sharing level corresponds to at least one of a volume of sensor data to be shared or a level of pre-processing of the sensor data to be shared.

In Example 11, the vehicle sensor-data sharing device of any one of Examples 1 to 10, wherein the one or more processors are further configured to determine a data pre-processing factor corresponding to a level of sensor data preprocessing, and wherein the observation or the request for observation information corresponds to the data preprocessing factor.

In Example 12, the vehicle sensor-data sharing device of any one of Examples 1 to 11, wherein the one or more processors determine the data preprocessing factor based at least on the criticality indicator and the reliability indicator.

In Example 13, the vehicle sensor-data sharing device of any one of Examples 1 to 12, further including receiving observation information pursuant to a Dedicated Short Range Communication (DSRC) protocol.

In Example 14, the vehicle sensor-data sharing device of any one of Examples 1 to 12, further including receiving observation information pursuant to an IST-G5 protocol.

In Example 15, the vehicle sensor-data sharing device of any one of Examples 1 to 14, further including sharing observation information to a Dedicated Short Range Communication (DSRC) protocol.

In Example 16, the vehicle sensor-data sharing device of any one of Examples 1 to 14, further including sharing observation information pursuant to an IST-G5 protocol.

In Example 17, the vehicle sensor-data sharing device of any one of Examples 13 to 16, wherein the observation information is sensor data from the second vehicle.

In Example 18, the vehicle sensor-data sharing device of any one of Examples 13 to 16, wherein the observation information includes sensor data from the second vehicle.

In Example 19, the vehicle sensor-data sharing device of any one of Examples 13 to 16, wherein the observation information includes sensor data from the first vehicle.

In Example 20, the vehicle sensor-data sharing device of any one of Examples 13 to 19, wherein the observation information includes pre-processed sensor data from the second vehicle.

In Example 21, the vehicle sensor-data sharing device of any one of Examples 13 to 19, wherein the observation information includes pre-processed sensor data from the first vehicle.

In Example 22, the vehicle sensor-data sharing device of any one of Examples 1 to 21, wherein the observation information is sent according to a vehicle-to-vehicle (V2V) transmission.

In Example 23, the vehicle sensor-data sharing device of any one of Examples 1 to 21, wherein the observation information is sent according to a device-to-device (D2D) transmission.

In Example 24, the vehicle sensor-data sharing device of any one of Examples 1 to 21, wherein the observation information is sent according to a broadcast.

In Example 25, the vehicle sensor-data sharing device of any one of Examples 1 to 21, wherein the observation information is sent according to a multicast.

In Example 26, the vehicle sensor-data sharing device of any one of Examples 1 to 25, wherein the one or more processors send observation information and a request for a determination corresponding to the observation information, as rendered by a second vehicle.

In Example 27, the vehicle sensor-data sharing device of any one of Examples 1 to 26, wherein the one or more processors are communicatively connected to a transmitter, and wherein the one or more processors are further configured to transmit the message.

In Example 28, a vehicle sensor-data sharing method, including receiving sensor information representing sensor data output from the one or more sensors of a first vehicle; determining a reliability indicator indicating the reliability of the received sensor information; determining from the received sensor information a criticality indicator indicating the criticality of the received sensor information for the first vehicle; selecting a data sharing level based on the criticality indicator and the reliability indicator; and generating a message including observation information or a request for observation information, wherein the observation information corresponds to sensor information according to the data sharing level.

In Example 29, the vehicle sensor-data sharing method of Example 28, wherein the criticality indicator is a predicted likelihood of collision of the first vehicle.

In Example 30, the vehicle sensor-data sharing method of Example 28 or 29, further including predicting a likelihood of collision of the first vehicle using the received sensor data, and wherein the predicted likelihood of collision corresponds to the criticality indicator.

In Example 31, the vehicle sensor-data sharing method of any one of Examples 28 to 30, wherein the reliability indicator is determined from one or more predetermined values.

In Example 32, the vehicle sensor-data sharing method of any one of Examples 28 to 30, wherein the reliability indicator is determined based on a comparison of observation information corresponding to sensor data from a first sensor with observation information corresponding to sensor data from a second sensor.

In Example 33, the vehicle sensor-data sharing method of any one of Examples 28 to 32, further including determining the reliability indicator by comparing observation information corresponding to sensor data from a first sensor with observation information corresponding to sensor data from a second sensor.

In Example 34, the vehicle sensor-data sharing method of any one of Examples 28 to 33, wherein the data sharing level corresponds to at least one of a quantity of sensor data to be shared or a level of sensor data pre-processing.

In Example 35, the vehicle sensor-data sharing method of any one of Examples 28 to 34, wherein the data sharing level is proportional to the criticality indicator.

In Example 36, the vehicle sensor-data sharing method of any one of Examples 28 to 35, wherein the data sharing level is inversely proportional to the reliability indicator.

In Example 37, the vehicle sensor-data sharing method of any one of Examples 28 to 36, wherein the data sharing level corresponds to at least one of a volume of sensor data to be shared or a level of pre-processing of the sensor data to be shared.

In Example 38, the vehicle sensor-data sharing method of any one of Examples 28 to 37, further including determining a data preprocessing factor corresponding to a level of sensor data preprocessing, and wherein the observation or the request for observation information corresponds to the data preprocessing factor.

In Example 39, the vehicle sensor-data sharing method of any one of Examples 28 to 38, further including determining the data preprocessing factor based at least on the criticality indicator and the reliability indicator.

In Example 40, the vehicle sensor-data sharing method of any one of Examples 28 to 39, further including receiving observation information pursuant to a Dedicated Short Range Communication (DSRC) protocol.

In Example 41, the vehicle sensor-data sharing method of any one of Examples 28 to 39, further including receiving observation information pursuant to an IST-G5 protocol.

In Example 42, the vehicle sensor-data sharing method of any one of Examples 28 to 41, further including sharing observation information to a Dedicated Short Range Communication (DSRC) protocol.

In Example 43, the vehicle sensor-data sharing method of any one of Examples 28 to 41, further including sharing observation information pursuant to an IST-G5 protocol.

In Example 44, the vehicle sensor-data sharing method of any one of Examples 40 to 43, wherein the observation information is sensor data from the second vehicle.

In Example 45, the vehicle sensor-data sharing method of any one of Examples 40 to 43, wherein the observation information includes sensor data from the second vehicle.

In Example 46, the vehicle sensor-data sharing method of any one of Examples 40 to 43, wherein the observation information includes sensor data from the first vehicle.

In Example 47, the vehicle sensor-data sharing method of any one of Examples 40 to 46, wherein the observation information includes pre-processed sensor data from the second vehicle.

In Example 48, the vehicle sensor-data sharing method of any one of Examples 40 to 46, wherein the observation information includes pre-processed sensor data from the first vehicle.

In Example 49, the vehicle sensor-data sharing method of any one of Examples 28 to 48, further including transmitting the observation information according to a vehicle-to-vehicle (V2V) transmission.

In Example 50, the vehicle sensor-data sharing method of any one of Examples 28 to 48, further including transmitting the observation information according to a method-to-method (D2D) transmission.

In Example 51, the vehicle sensor-data sharing method of any one of Examples 28 to 48, further including transmitting the observation information according to a broadcast.

In Example 52, the vehicle sensor-data sharing method of any one of Examples 28 to 48, further including transmitting the observation information according to a multicast.

In Example 53, the vehicle sensor-data sharing method of any one of Examples 28 to 52, further including sending observation information and a request for a determination corresponding to the observation information, as rendered by a second vehicle.

In Example 54, the vehicle sensor-data sharing method of any one of Examples 28 to 53, further including transmitting the message.

In Example 55, a vehicle sensor-data sharing means, including one or more processing means for receiving sensor information representing sensor data output from the one or more sensors of a first vehicle; determining a reliability indicator indicating the reliability of the received sensor information; determining from the sensor information a criticality indicator, indicating the criticality of the received sensor information for the first vehicle; selecting a data sharing level based on the criticality indicator and the reliability indicator; and generating a message including observation information or a request for observation information, wherein the observation information corresponds to sensor information according to the data sharing level.

In Example 56, the vehicle sensor-data sharing means of Example 55, wherein the criticality indicator is a predicted likelihood of collision of the first vehicle.

In Example 57, the vehicle sensor-data sharing means of Example 55 or 56, wherein the one or more processing means are further for predicting a likelihood of collision of the first vehicle using the received sensor data, and wherein the predicted likelihood of collision corresponds to the criticality indicator.

In Example 58, the vehicle sensor-data sharing means of any one of Examples 55 to 57, wherein the reliability indicator is determined from one or more predetermined values.

In Example 59, the vehicle sensor-data sharing means of any one of Examples 55 to 57, wherein the reliability indicator is determined based on a comparison of observation information corresponding to sensor data from a first sensor with observation information corresponding to sensor data from a second sensor.

In Example 60, the vehicle sensor-data sharing means of any one of Examples 55 to 59, wherein the one or more processing means are further for determining the reliability indicator by comparing observation information corresponding to sensor data from a first sensor with observation information corresponding to sensor data from a second sensor.

In Example 61, the vehicle sensor-data sharing means of any one of Examples 55 to 60, wherein the data sharing level corresponds to at least one of a quantity of sensor data to be shared or a level of sensor data pre-processing.

In Example 62, the vehicle sensor-data sharing means of any one of Examples 55 to 61, wherein the data sharing level is proportional to the criticality indicator.

In Example 63, the vehicle sensor-data sharing means of any one of Examples 55 to 62, wherein the data sharing level is inversely proportional to the reliability indicator.

In Example 64, the vehicle sensor-data sharing means of any one of Examples 55 to 63, wherein the data sharing level corresponds to at least one of a volume of sensor data to be shared or a level of pre-processing of the sensor data to be shared.

In Example 65, the vehicle sensor-data sharing means of any one of Examples 55 to 64, wherein the one or more processing means are further for determining a data preprocessing factor corresponding to a level of sensor data preprocessing, and wherein the observation or the request for observation information corresponds to the data preprocessing factor.

In Example 66, the vehicle sensor-data sharing means of any one of Examples 55 to 65, wherein the one or more processing means determine the data preprocessing factor based at least on the criticality indicator and the reliability indicator.

In Example 67, the vehicle sensor-data sharing means of any one of Examples 55 to 66, further including receiving observation information pursuant to a Dedicated Short Range Communication (DSRC) protocol.

In Example 68, the vehicle sensor-data sharing means of any one of Examples 55 to 66, further including receiving observation information pursuant to an IST-G5 protocol.

In Example 69, the vehicle sensor-data sharing means of any one of Examples 55 to 68, further including sharing observation information to a Dedicated Short Range Communication (DSRC) protocol.

In Example 70, the vehicle sensor-data sharing means of any one of Examples 55 to 68, further including sharing observation information pursuant to an IST-G5 protocol.

In Example 71, the vehicle sensor-data sharing means of any one of Examples 67 to 70, wherein the observation information is sensor data from the second vehicle.

In Example 72, the vehicle sensor-data sharing means of any one of Examples 67 to 70, wherein the observation information includes sensor data from the second vehicle.

In Example 73, the vehicle sensor-data sharing means of any one of Examples 67 to 70, wherein the observation information includes sensor data from the first vehicle.

In Example 74, the vehicle sensor-data sharing means of any one of Examples 67 to 73, wherein the observation information includes pre-processed sensor data from the second vehicle.

In Example 75, the vehicle sensor-data sharing means of any one of Examples 67 to 73, wherein the observation information includes pre-processed sensor data from the first vehicle.

In Example 76, the vehicle sensor-data sharing means of any one of Examples 55 to 75, wherein the observation information is sent according to a vehicle-to-vehicle (V2V) transmission.

In Example 77, the vehicle sensor-data sharing means of any one of Examples 55 to 75, wherein the observation information is sent according to a means-to-means (D2D) transmission.

In Example 78, the vehicle sensor-data sharing means of any one of Examples 55 to 75, wherein the observation information is sent according to a broadcast.

In Example 79, the vehicle sensor-data sharing means of any one of Examples 55 to 75, wherein the observation information is sent according to a multicast.

In Example 80, the vehicle sensor-data sharing means of any one of Examples 55 to 79, wherein the one or more processing means send observation information and a request for a determination corresponding to the observation information, as rendered by a second vehicle.

In Example 81, the vehicle sensor-data sharing means of any one of Examples 55 to 80, wherein the one or more processing means are communicatively connected to a transmitter, and wherein the one or more processing means are further for transmitting the message.

In Example 82, a non-transient computer readable medium configured to cause one or more processors to perform the method of receiving sensor information representing sensor data output from the one or more sensors of a first vehicle; determining a reliability indicator indicating the reliability of the received sensor information; determining from the received sensor information a criticality indicator indicating the criticality of the received sensor information for the first vehicle; selecting a data sharing level based on the criticality indicator and the reliability indicator; and generating a message including observation information or a request for observation information, wherein the observation information corresponds to sensor information according to the data sharing level.

In Example 83, a non-transient computer readable medium configured to cause one or more processors to perform the method of any one of Examples 28 to 54.

In Example 84, a sensor-data sharing device is disclosed, comprising:
one or more processors configured to receive sensor information representing sensor data output from the one or more sensors of a first device; determine a reliability indicator indicating the reliability of the received sensor information; determine from the received sensor information a criticality indicator indicating the criticality of the received sensor information for the first device;
select a data sharing level based on the criticality indicator and the reliability indicator; and
generate a message comprising observation information or a request for observation information, wherein the observation information corresponds to sensor information according to the data sharing level.

In Example 85, the sensor-data sharing device of Example 1 is disclosed, wherein the criticality indicator is a predicted likelihood of collision of the first device.

In Example 86, the sensor-data sharing device of Example 1 or 2 is disclosed, wherein the one or more processors are further configured to predict a likelihood of collision of the first device using the received sensor data, and wherein the predicted likelihood of collision corresponds to the criticality indicator.

In Example 87, the sensor-data sharing device of any one of Examples 1 to 3 is disclosed, wherein the reliability indicator is determined from one or more predetermined values.

In Example 88, the sensor-data sharing device of any one of Examples 1 to 3 is disclosed, wherein the reliability indicator is determined based on a comparison of observation information corresponding to sensor data from a first sensor with observation information corresponding to sensor data from a second sensor.

In Example 89, the sensor-data sharing device of any one of Examples 1 to 5 is disclosed, wherein the one or more processors are further configured to determine the reliability indicator by comparing observation information corresponding to sensor data from a first sensor with observation information corresponding to sensor data from a second sensor.

In Example 90, the sensor-data sharing device of any one of Examples 1 to 6 is disclosed, wherein the data sharing level corresponds to at least one of a quantity of sensor data to be shared or a level of sensor data pre-processing.

In Example 91, the sensor-data sharing device of any one of Examples 1 to 7 is disclosed, wherein the data sharing level is proportional to the criticality indicator.

In Example 92, the sensor-data sharing device of any one of Examples 1 to 8 is disclosed, wherein the data sharing level is inversely proportional to the reliability indicator.

In Example 93, the sensor-data sharing device of any one of Examples 1 to 9 is disclosed, wherein the data sharing level corresponds to at least one of a volume of sensor data to be shared or a level of pre-processing of the sensor data to be shared.

In Example 94, the sensor-data sharing device of any one of Examples 1 to 10 is disclosed, wherein the one or more processors are further configured to determine a data pre-processing factor corresponding to a level of sensor data preprocessing, and wherein the observation or the request for observation information corresponds to the data preprocessing factor.

In Example 95, the sensor-data sharing device of any one of Examples 1 to 11 is disclosed, wherein the one or more processors determine the data preprocessing factor based at least on the criticality indicator and the reliability indicator.

In Example 96, the sensor-data sharing device of any one of Examples 1 to 12 is disclosed, further comprising receiving observation information pursuant to a Dedicated Short Range Communication (DSRC) protocol.

In Example 97, the sensor-data sharing device of any one of Examples 1 to 12 is disclosed, further comprising receiving observation information pursuant to an IST-G5 protocol.

In Example 98, the sensor-data sharing device of any one of Examples 1 to 14 is disclosed, further comprising sharing observation information to a Dedicated Short Range Communication (DSRC) protocol.

In Example 99, the sensor-data sharing device of any one of Examples 1 to 14 is disclosed, further comprising sharing observation information pursuant to an IST-G5 protocol.

In Example 100, the sensor-data sharing device of any one of Examples 13 to 16 is disclosed, wherein the observation information is sensor data from the second device.

In Example 101, the sensor-data sharing device of any one of Examples 13 to 16 is disclosed, wherein the observation information comprises sensor data from the second device.

In Example 102, the sensor-data sharing device of any one of Examples 13 to 16 is disclosed, wherein the observation information comprises sensor data from the first device.

In Example 103, the sensor-data sharing device of any one of Examples 13 to 19 is disclosed, wherein the observation information comprises pre-processed sensor data from the second device.

In Example 104, the sensor-data sharing device of any one of Examples 13 to 19 is disclosed, wherein the observation information comprises pre-processed sensor data from the first device.

In Example 105, the sensor-data sharing device of any one of Examples 1 to 21 is disclosed, wherein the observation information is sent according to a vehicle-to-vehicle (V2V) transmission.

In Example 106, the sensor-data sharing device of any one of Examples 1 to 21 is disclosed, wherein the observation information is sent according to a device-to-device (D2D) transmission.

In Example 107, the sensor-data sharing device of any one of Examples 1 to 21 is disclosed, wherein the observation information is sent according to a broadcast.

In Example 108, the sensor-data sharing device of any one of Examples 1 to 21 is disclosed, wherein the observation information is sent according to a multicast.

In Example 109, the sensor-data sharing device of any one of Examples 1 to 25 is disclosed, wherein the one or more processors send observation information and a request for a determination corresponding to the observation information, as rendered by a second device.

In Example 110, the sensor-data sharing device of any one of Examples 1 to 26 is disclosed, wherein the one or more processors are communicatively connected to a transmitter, and wherein the one or more processors are further configured to transmit the message.

In Example 111, the sensor-data sharing device of any one of Examples 1 to 27 is disclosed, wherein the one or more processors are further configured to determine from the received sensor information an environmental factor, corresponding to a vicinity of the sensor-data sharing device; determine an operational quality of the sensor-data sharing device is disclosed, wherein the operational quality corresponds to a manner operation of the of the data-sharing device; and generate a message comprising a request for a second sensor-data sharing device to operate according to the operational quality.

In Example 112, the sensor-data sharing device of any one of Examples 1 to 27 is disclosed, wherein the one or more processors are further configured to determine from the received sensor information an environmental factor, corresponding to a vicinity of the sensor-data sharing device; receive a request for the sensor-data sharing device to operate according to an operational quality is disclosed, wherein the operational quality corresponds to a manner operation of the of the data-sharing device; and accept or reject the request to operated according to the operational quality based on the environmental factor.

In Example 113, the sensor-data sharing device of Examples 28 or 29 is disclosed, wherein the environmental factor corresponds to at least one of a roadway density, a traffic density, a roadway condition, a weather condition, or at visibility.

In Example 114, the sensor-data sharing device of any one of Examples 28 to 30 is disclosed, wherein the operational quality corresponds to at least one of a maximum velocity, a minimum velocity, a minimum distance between vehicles, or a maximum maneuver risk.

In Example 115, the sensor-data sharing device of any one of Examples 1 to 31 is disclosed, wherein the sensor-data sharing device is at least one of a smartphone, an infrastructure equipment device, a Road Side Unit (RSU), or a Multi-Access Edge Computing (MEC) entity.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A vehicle sensor-data sharing device, comprising:
    one or more processors configured to:
        receive sensor information representing sensor data output from the one or more sensors of a first vehicle;
        determine a reliability indicator indicating the reliability of the received sensor information;
        determine from the received sensor information a criticality indicator indicating the criticality of the received sensor information for the first vehicle;
        select a data sharing level based on the criticality indicator and the reliability indicator; and
        generate a message comprising observation information or a request for observation information, wherein the observation information corresponds to sensor information according to the data sharing level.

2. The vehicle sensor-data sharing device of claim 1, wherein the criticality indicator is a predicted likelihood of collision of the first vehicle.

3. The vehicle sensor-data sharing device of claim 1, wherein the one or more processors are further configured to predict a likelihood of collision of the first vehicle using the received sensor data, and wherein the predicted likelihood of collision corresponds to the criticality indicator.

4. The vehicle sensor-data sharing device of claim 1, wherein the reliability indicator is determined from one or more predetermined values.

5. The vehicle sensor-data sharing device of claim 1, wherein the one or more processors are further configured to determine the reliability indicator by comparing observation information corresponding to sensor data from a first sensor with observation information corresponding to sensor data from a second sensor.

6. The vehicle sensor-data sharing device of claim 1, wherein the data sharing level corresponds to at least one of a quantity of sensor data to be shared or a level of sensor data pre-processing.

7. The vehicle sensor-data sharing device of claim 1, wherein the data sharing level is proportional to the criticality indicator.

8. The vehicle sensor-data sharing device of claim 1, wherein the data sharing level is inversely proportional to the reliability indicator.

9. The vehicle sensor-data sharing device of claim 1, wherein the one or more processors are further configured to determine a data preprocessing factor corresponding to a level of sensor data preprocessing, and wherein the observation information or the request for observation information corresponds to the data preprocessing factor.

10. The vehicle sensor-data sharing device of claim 1, wherein the one or more processors determine the data preprocessing factor based at least on the criticality indicator and the reliability indicator.

11. The vehicle sensor-data sharing device of claim 1, wherein the observation information comprises sensor data from a second vehicle and the first vehicle.

12. The vehicle sensor-data sharing device of claim 1, wherein the one or more processors are communicatively connected to a transmitter, and wherein the one or more processors are further configured to transmit the message.

13. A vehicle sensor-data sharing method, comprising:
receiving sensor information representing sensor data output from the one or more sensors of a first vehicle;
determining a reliability indicator indicating the reliability of the received sensor information;
determining from the received sensor information a criticality indicator indicating the criticality of the received sensor information for the first vehicle;
selecting a data sharing level based on the criticality indicator and the reliability indicator; and
generating a message comprising observation information or a request for observation information, wherein the observation information corresponds to sensor information according to the data sharing level.

14. The vehicle sensor-data sharing method of claim 13, wherein the criticality indicator is a predicted likelihood of collision of the first vehicle.

15. The vehicle sensor-data sharing method of claim 13, further comprising predicting a likelihood of collision of the first vehicle using the received sensor data, and wherein the predicted likelihood of collision corresponds to the criticality indicator.

16. The vehicle sensor-data sharing method of claim 13, wherein the reliability indicator is determined from one or more predetermined values.

17. The vehicle sensor-data sharing method of claim 13, wherein the reliability indicator is determined based on a comparison of observation information corresponding to sensor data from a first sensor with observation information corresponding to sensor data from a second sensor.

18. A non-transitory computer readable medium configured to cause one or more processors to perform the method of:
receiving sensor information representing sensor data output from the one or more sensors of a first vehicle;
determining a reliability indicator indicating the reliability of the received sensor information;
determining from the received sensor information a criticality indicator indicating the criticality of the received sensor information for the first vehicle;
selecting a data sharing level based on the criticality indicator and the reliability indicator; and
generating a message comprising observation information or a request for observation information, wherein the observation information corresponds to sensor information according to the data sharing level.

19. The non-transitory computer readable medium of claim 18, wherein the non-transient computer readable medium is further configured to cause one or more processors to predict a likelihood of collision of the first vehicle using the received sensor data, and wherein the predicted likelihood of collision corresponds to the criticality indicator.

20. A sensor-data sharing device, comprising:
one or more processors configured to:
receive sensor information representing sensor data output from the one or more sensors of a first device;
determine a reliability indicator indicating the reliability of the received sensor information;
determine from the received sensor information a criticality indicator indicating the criticality of the received sensor information for the first device;
select a data sharing level based on the criticality indicator and the reliability indicator; and
generate a message comprising observation information or a request for observation information, wherein the observation information corresponds to sensor information according to the data sharing level.

21. The sensor-data sharing device of claim 20, wherein the one or more processors are further configured to determine from the received sensor information an environmental factor, corresponding to a vicinity of the sensor-data sharing device;
determine an operational quality of the sensor-data sharing device, wherein the operational quality corresponds to a manner operation of the of the data-sharing device; and
generate a message comprising a request for a second sensor-data sharing device to operate according to the operational quality.

22. The sensor-data sharing device of claim 21, wherein the environmental factor corresponds to at least one of a roadway density, a traffic density, a roadway condition, a weather condition, or at visibility.

23. The sensor-data sharing device of claim 21, wherein the operational quality corresponds to at least one of a maximum velocity, a minimum velocity, a minimum distance between vehicles, or a maximum maneuver risk.

24. The sensor-data sharing device of claim 20, wherein the one or more processors are further configured to determine from the received sensor information an environmental factor, corresponding to a vicinity of the sensor-data sharing device;
receive a request for the sensor-data sharing device to operate according to an operational quality, wherein the operational quality corresponds to a manner operation of the of the data-sharing device; and
accept or reject the request to operated according to the operational quality based on the environmental factor.

25. The sensor-data sharing device of claim 20, wherein the sensor-data sharing device is at least one of a smartphone, an infrastructure equipment device, a Road Side Unit (RSU), or a Multi-Access Edge Computing (MEC) entity.

\* \* \* \* \*